G. HUHN.
PACKING FOR PISTON RODS AND THE LIKE.
APPLICATION FILED APR. 23, 1909.

943,019.

Patented Dec. 14, 1909.

Witnesses

Inventor
Gustav Huhn
by Howard A. Coombs
Attorney

UNITED STATES PATENT OFFICE.

GUSTAV HUHN, OF BERLIN, GERMANY.

PACKING FOR PISTON-RODS AND THE LIKE.

943,019.

Specification of Letters Patent.    Patented Dec. 14, 1909.

Application filed April 23, 1909.   Serial No. 491,822.

*To all whom it may concern:*

Be it known that I, GUSTAV HUHN, manufacturer, a subject of the Emperor of Germany, and residing at Berlin, Prussia, Germany, have invented certain new and useful Improvements in Packing for Piston-Rods and the Like, of which the following is a specification.

My invention relates to packing for piston-rods and the like, and consists in an improved form of self-lubricating metallic packing ring, and in the combination and arrangement thereof with rings or gaskets of other materials, whereby very satisfactory results have been obtained.

In Letters Patent of the United States, No. 899,985, granted to me September 29, 1908, I described and illustrated a packing consisting of hollow, soft-metal split rings, substantially rectangular in cross-section, and filled with a lubricating material, such as graphite. A number of these assembled together substantially fill a stuffing-box, and remain efficient for a long period of time, without attention. Such rings have proved themselves very efficient in practice, and are eminently satisfactory where the pressure of the fluid in the cylinder does not exceed a certain amount.

The object of the present invention is the provision of a packing of the same type as that disclosed in said patent, but so constructed and combined with rings or gaskets of other material as to enable it to successfully lubricate a piston-rod for a long time and at the same time prevent the leakage of fluids under very high pressure along the rod.

One of the principal applications and fields of usefulness of this improved packing has proved to be its use in the stuffing-boxes of ammonia refrigerating machines, for which it is highly desirable, but very difficult to use a packing which will effectually prevent leakage of the ammonia along the piston-rod and, at the same time, will adequately lubricate the rod under continuous service for many months at a time.

Figure 1:
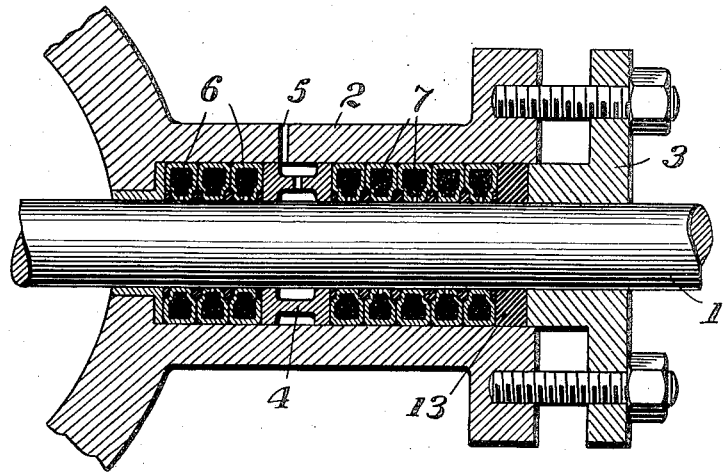
Figure 2:
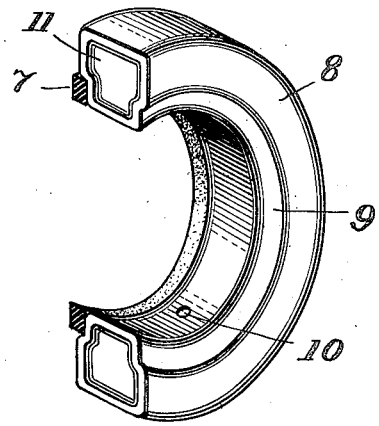

In the accompanying drawings:—Figure 1 is a longitudinal sectional view through a piston-rod stuffing-box containing my improved packing, and Fig. 2 is a perspective view of a section of a split metallic ring and a gasket.

The piston-rod of a compressor, or the like, working under high pressures, is represented at 1, its stuffing-box at 2, and gland at 3. The stuffing-boxes of ammonia machines are usually made of extra length and contain, in addition to packing, one or more "oil lanterns", such as is represented at 4, an opening 5 being provided in the wall of the stuffing-box for the admission of oil under pressure. In place of the ordinary forms of packing used in connection with the said lantern, I use a special form of my hollow, soft-metal rings, indicated in Fig. 1, at 6, in combination with rings or gaskets 7 of an elastic composition. The rings are, for convenience, split, that is to say, are made in semi-circular sections, one of which is illustrated at 8, in Fig. 2. These are made of a hollow tube of soft-metal, wound upon a mandrel, sawed apart, and then pressed in dies to a substantially rectangular shape in cross-section. For a short distance back from their inner faces, however, their sides are indented, as indicated at 9 in Fig. 2. In other words, the rings are reduced in width near their smaller peripheries, which are provided with some apertures 10 for the passage of the lubricant. While the latter may be graphite, or any suitable lubricating material, for use in ammonia machines I prefer a non-freezing oil, and fill the ring sections with loose cotton fiber and such oil. The ends of the sections are closed by thin lead plates 11, secured therein by soldering. Several of such split rings are assembled in the stuffing-box, on each side of the oil lantern, and, in the spaces formed by the indentations 9, I place the split rings or gaskets 7, which are made of a rubber composition, or some other material, which is yielding yet elastic and will not be injuriously affected by heat or by the oil, or the ammonia. On the other side of the lantern, I assemble another row of metallic packing rings with the gaskets 7, interposed between them. Behind the last ring is placed an expansion ring 13, of similar material to the gaskets, and then the gland is screwed down.

In use, the interstices at 14 become filled with the lubricant and increased pressure by the gland serves to press both the reduced ends of the rings and the gaskets more tightly against the rod.

This system of packing has kept the rod of an ammonia machine well lubricated throughout a period of over six months, running continuously and without leakage.

However, I do not wish to be understood as confining the adaptability of my improved packing to ammonia machines, as it will be found very useful wherever high pressures are employed.

What I claim is:—

1. A packing for piston-rods and the like, consisting of a hollow, soft-metal ring containing lubricant, substantially rectangular in cross-section but reduced in width near its inner periphery.

2. A packing for piston-rods and the like, comprising hollow, split metal rings closed at their ends and containing lubricant, said rings being substantially rectangular in cross-section but reduced in width near their inner periphery.

3. A packing for piston-rods and the like, comprising in combination hollow, metal rings containing lubricant, substantially rectangular in cross-section but reduced in width near their inner peripheries, and gaskets of elastic material interposed between a pair of adjacent rings within the space formed by their reduced portions.

4. In a packing for piston-rods and the like, the combination with a plurality of hollow, split metal rings, closed at their ends and containing lubricating material, said rings being substantially rectangular in cross-section but reduced in width near their inner peripheries and having perforations in the latter for the passage of the lubricant, of split rings or gaskets of elastic material interposed between each pair of metal rings within the space formed by their reduced portions.

5. In a packing for piston-rods and the like, the combination with a plurality of hollow, split, metal rings substantially rectangular in cross-section but reduced in width near their inner peripheries, gaskets of elastic material interposed between said rings within the space formed by their reduced portions, said rings containing lubricant and having openings in their inner peripheries for the passage thereof, and an expansion ring of elastic material bearing against the end one of said metal rings.

In testimony whereof I have affixed my signature, in presence of two witnesses.

GUSTAV HUHN.

Witnesses:
 WOLDEMAR HAUPT,
 HENRY HASPER.